Dec. 20, 1927.
E. EDWARDS
1,653,396
LOCKING MEANS FOR POTTERY MOLDS
Filed March 24, 1927
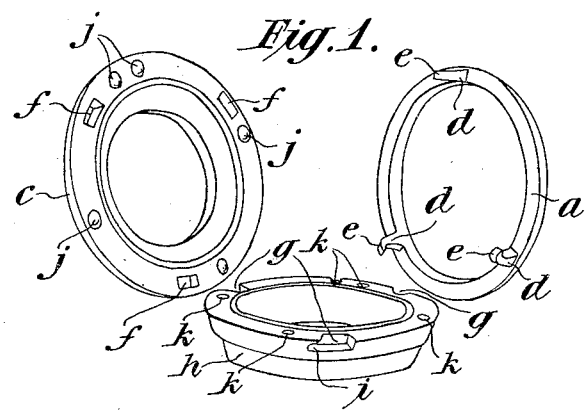
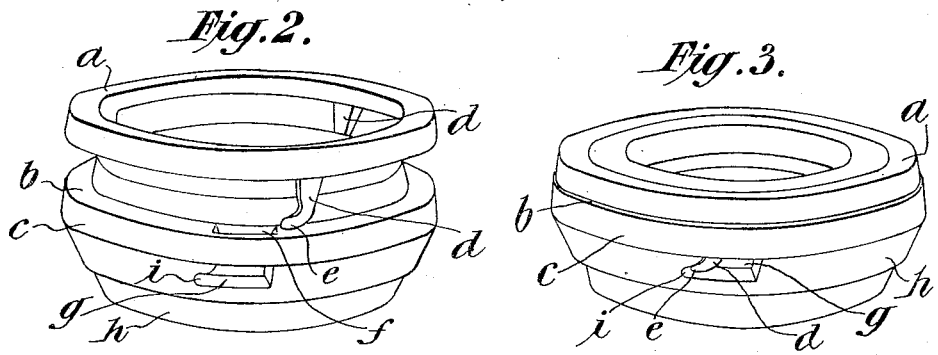
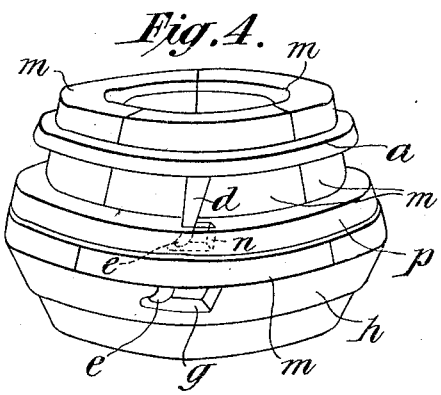
INVENTOR
ERNEST EDWARDS Patented Dec. 20, 1927.

UNITED STATES PATENT OFFICE.

ERNEST EDWARDS, OF STOKE-ON-TRENT, ENGLAND.

LOCKING MEANS FOR POTTERY MOLDS.

Application filed March 24, 1927, Serial No. 177,958, and in Great Britain December 21, 1926.

This invention relates to locking rings for pottery molds. The object of the invention is the provision of an improved means for locking together the component units of a pottery mold, the locking and unlocking being effected in a short space of time and with the minimum of effort. Important advantages of the invention are that there is no tendency on the part of the component mold units to "bind" together and that the use of the locking device does not restrict it to the manufacture of plain articles, or to any size of mold, provided same is circular.

It is known that the upper and lower units of a two-part mold divided horizontally have been connected together by means of wedge-shaped horizontally disposed projections which engaged in slightly inclined recesses or undercut ribs so that on a partial rotation of the projections, which extended from an aluminium or other metal ring embedded in the undersurface of the upper unit of the mold, said projections locked with the inclined recesses or undercut ribs which were formed in the upper part of the lower unit of the mold, thus firmly holding the units connected together.

Broadly, the invention consists in locking the component units of a mold together by means of one or more ring-like structures adapted to rest on the uppermost mold unit or units, and having depending members adapted, when only one ring-like structure is employed, to engage with shaped portions in the lowermost unit, but when two ring-like structures are employed to engage the depending members of the upper ring-like structure with shaped portions of the lower ring-like structure, and the depending portions of said lower ring-like structure with shaped portions in the lowermost unit of the mold, locking being effected by partial rotation of the ring-like structure or structures.

In order that the invention may be more readily understood, reference is directed to the accompanying sheet of drawings, wherein:—

Figure 1 shows the components of a two-part mold and a locking ring for use therewith.

Figure 2 shows the locking ring about to engage with the mold.

Figure 3 shows the mold with the locking ring in position; and,

Figure 4 shows the method of combining two ring-like structures for use with molds comprised of a plurality of component units.

As shown in the drawings, the invention comprises a ring $a$ of aluminium or other durable and preferably light material adapted to rest upon the top face $b$ of the upper half $c$ of a mold of plaster-of-Paris or equivalent material, such as is generally used in the manufacture of pottery. A plurality of claws or hook-members $d$, say three, are conveniently spaced around and downwardly depend from the ring $a$, the shanks of the claws or hook-members terminating in sidewardly turned or bent ends $e$. A corresponding number of slots $f$ are provided near the outer edge of the upper mold half $c$, the slots $f$ each being wide enough to allow a claw $d$ and its turned or bent end $e$ to be dropped directly thereinto. Immediately below the slots $f$ in the upper mold half $c$, gaps $g$ are made in the lower mold half $h$, so that when the slots $f$ and gaps $g$ in upper and lower mold halves $c$ and $h$ respectively register, the sidewardly turned or bent ends $e$ of the claws or hooks $d$ may be dropped through the slots $f$ in the upper mold half $c$ into the gaps $g$ in the lower mold half $h$. A branch port or channel $i$ is provided at the base of each gap $g$ in the lower mold half $h$, on the side of and of a shape substantially similar to the turned or bent end $e$ of the claw or hook $d$, so that partial rotation of the ring $a$ causes the ends $e$ of the claws or hooks $d$ to enter the branch ports or channels $i$ and so prevent removal of the ring $a$ and separation of the mold halves $c$, $h$ by direct upward lifting. The upper and under faces of the turned end $e$ of the claw $d$ and the branch port or channel $i$ respectively are preferably inclined or tapered, so that immediately the inclined faces meet, due to partial rotation of the ring, they are effectively bound together.

If desired, the slots $f$ in the upper mold half $c$ may be replaced by gaps similar to the gaps $g$ in the lower mold half $h$.

The usual hemispherical dowel pin $j$ and recess $k$ to ensure correct registration of the mold halves $c$, $h$ are provided, or the claws or hooks $d$ when in the closed position may be relied upon to act in that capacity.

Figure 4 illustrates the method of combining or employing simultaneously two ring-like structures for use with a mold comprised of a plurality of component units.

In the example of mold shown, the lower mold $h$ is of substantially similar construction to that shown in the two-part mold illustrated by Figures 1, 2 and 3. The upper structure of the mold is, however, comprised of a plurality of component units $m$ with vertical seams or joints. These units $m$ are bound together by a ring-like structure $a$ similar to that previously described, the claws or hooks $d$ thereof being adapted to engage with sockets $n$ in a second ring $p$. The second ring $p$ retains the collected units $m$ in correct relation to the lowermost mold unit $h$ in the manner described heretofore.

Alternatively, a tongue-and-groove joint for purposes of registering the mold halves may be incorporated in the construction of the slots and gaps above referred to.

I claim:—

1. A mold construction including separable upper and lower sections, the upper section being provided with openings and the lower section being provided with bayonet sockets registering with said openings, and a locking ring having depending locking members provided with laterally offset feet adapted to enter said openings and upon movement relative to the said sections interlock with said bayonet sockets to thereby hold the sections against separation.

2. A pottery mold construction including separate superimposed sections, the lowermost section comprising a bottom mold unit having bayonet sockets accessible from one edge thereof, a lower locking ring having depending locking members formed with laterally projecting feet adapted to engage the sockets in the bottom mold section upon partial rotation and having bayonet sockets in its upper surface, and an intermediate mold unit between said locking ring and the bottom mold unit and the next adjacent upper section, and comprising a plurality of arcuate members together forming a complete ring and a second locking ring adapted to embrace and lock the arcuate members, said second locking ring having depending members with laterally projecting feet adapted to engage in said bayonet sockets of the first mentioned locking ring.

In testimony whereof I have affixed my signature hereto this fourteenth day of March 1927.

ERNEST EDWARDS.